United States Patent [19]

Mizuno et al.

[11] 3,959,440

[45] May 25, 1976

[54] METHOD FOR REMOVING $SO_2$ AND $NO_x$ SIMULTANEOUSLY FROM THE EXHAUST OF A COMBUSTION FURNACE

[75] Inventors: Minoru Mizuno, Yokohama; Tomoji Iwata, Kawasaki, both of Japan

[73] Assignee: Nippon Kokan Kabushiki Kaisha, Tokyo, Japan

[22] Filed: Apr. 30, 1975

[21] Appl. No.: 573,589

[30] Foreign Application Priority Data

May 8, 1974 Japan.............................. 49-50896

[52] U.S. Cl................................. 423/239; 423/242
[51] Int. Cl.²......................................... B01D 53/34
[58] Field of Search............................ 423/239, 242

[56] References Cited
UNITED STATES PATENTS

| 3,822,339 | 7/1974 | Mizuno et al........................ | 423/242 |
| 3,864,451 | 2/1974 | Lee et al............................. | 423/239 |

OTHER PUBLICATIONS

Markvart et al., "Journal of Catalysis" Vol. 7, No. 3, Mar. 1967; pp. 279–281.

*Primary Examiner*—G. O. Peters
*Attorney, Agent, or Firm*—Flynn & Frishauf

[57] ABSTRACT

$NO_x$ gas remaining in a purified exhaust, which has been desulfurized, in accordance with a publicly known method using coke oven gas, by washing the original exhaust containing $SO_2$ and $NO_x$ with a water solution mainly consisting of ammonium sulfite concentrated to about 30 percent by weight, the pH value and the temperature thereof being adjusted to 6.1 to 6.5 and 50° to 55°C respectively, can be reformed into harmless $N_2$ by passing said desulfurized exhaust through a reducing catalyst at a temperaure of 200° to 450°C, wherein ammonia gas naturally brought into said desulfurized exhaust from the washing solution acts as a reducing agent.

5 Claims, 2 Drawing Figures

METHOD FOR REMOVING $SO_2$ AND $NO_x$ SIMULTANEOUSLY FROM THE EXHAUST OF A COMBUSTION FURNACE

This invention relates to a method for rendering the exhaust of a combustion furnace harmless and particularly removing $SO_2$ and $NO_x$ therefrom simultaneously.

Heretofore, there has been known a method for removing harmful $NO_x$ gas from the exhaust of a combustion furnace using fresh ammonia gas as a reducing agent together with a dry catalyst, such as platinum, cobalt oxide, copper oxide, vanadium oxide or pure iron oxide, in order to reform said $NO_x$ gas into harmless $N_2$ gas catalytically at a temperature of from 200° to 450°C. However, as the fresh ammonia is highly expensive, the above-mentioned method is not economical industrially.

The present invention concerns an improved method for removing $NO_x$ from the exhaust in accordance with the abovementioned method using a waste ammonia gas instead of fresh ammonia gas as the reducing agent.

Furthermore, the present invention concerns an improved method for removing harmful $SO_2$ gas together with $NO_x$ gas from the exhaust simultaneously.

These improvements can be attained in accordance with a present invention by bettering a publicly known desulfurization method of U.S. Pat. No. 3,822,339, which comprises washing an exhaust, such as the one generated from a boiler furnace or an iron ore sintering plant, with a water solution mainly consisting of ammonium sulfite having a concentration of about 30 percent by weight to remove $SO_2$ from said exhaust in the form of ammonium hydrogen sulfite; and passing coke oven gas through the water solution of ammonium hydrogen sulfite thus obtained to cause ammonia gas contained in the coke oven gas to react with the ammonium hydrogen sulfite, whereby ammonium sulfite water solution is recovered to be used again circulatingly.

Regarding the above-mentioned process, an interesting fact has been found by the present inventors for the first time. That is, when the pH value and the temperature of ammonium sulfite solution used for washing of the exhaust is adjusted to be 6.1 to 6.5 and 50° to 55°C, the exhaust washed by this solution contains ammonia gas at the concentration of 150 to 500 ppm. The principle of this invention is to utilize this ammonia gas contained in the desulfurized exhaust as a reducing agent for reforming $NO_x$ gas in the desulfurized gas into harmless nitrogen gas catalytically.

The present invention will best be understood and appreciated from the following description of the process taken in connection with the accompanying drawing in which.

Figure 1:
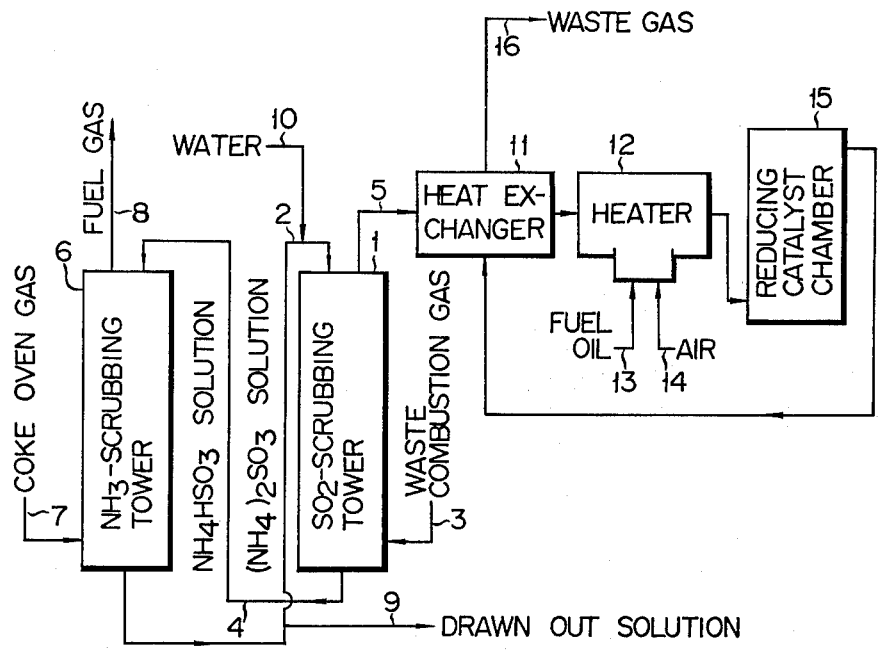
FIG. 1 is a brief flow diagram showing the process of this invention.

The process of this invention will be explained with reference to FIG. 1. A circulating water solution 2 mainly consisting of ammonium sulfite at the concentration of about 30 percent by weight is introduced into a $SO_2$-scrubbing tower 1 from the top thereof, while a waste combustion gas 3 (that is, an exhaust,) is introduced into said scrubbing tower 1 from the bottom part thereof. As a result, the $SO_2$ gas contained in the exhaust reacts with ammonium sulfite dissolved in the circulating water solution 2 to be changed into ammonium hydrogen sulfite, and a water solution 4 mainly consisting of ammonium hydrogen sulfite is drawn out from the bottom of the $SO_2$-scrubbing tower 1. The desulfurized exhaust 5 containing $NO_x$ gas as a harmful impurity is discharged from the top of $SO_2$-scrubbing tower 1. The subsequent process of reforming $NO_x$ contained in the desulfurized exhaust 5 into $N_2$ will be described later on.

The water solution 4 drawn out from the $SO_2$-scrubbing tower 1 is charged circulatingly into an $NH_3$-scrubbing tower 6 from the top thereof, while coke oven gas 7 is introduced into said scrubbing tower 6 from the bottom part thereof. As a result, ammonia gas contained in the coke oven gas reacts with ammonium hydrogen sulfite to be changed into ammonium sulfite, and a water solution 2 mainly consisting of ammonium sulfite is drawn out from the bottom part of the $NH_3$-scrubbing tower 6 and is fed, as previously mentioned, into the $SO_2$-scrubbing tower 1. The gas 8 drawn out from the top of $NH_3$-scrubbing tower 6 is used as a fuel gas for other applications.

Both scrubbing solutions are circulated between both towers 1 and 6, so that the respective main components of both scrubbing solutions increase gradually in concentration. In order to maintain both concentrations at a prescribed level, a portion of circulating solution is continuously drawn out from the circulating system at a specified rate, and the drawn out solution 9 is subjected to air-oxidation in accordance with the customary method to recover ammonium sulfate. Further, the circulating system is supplied with a fresh water 10 in order to maintain the amount of each circulating solution to be constant.

The aforementioned desulfurizing process is not novel, but publicly known already. (See Belgian Pat. No. 784,594 corresponding to U.S. Pat. No. 3,822,339.). In this known process, the flowing amount of coke oven gas is controlled so that the pH value of the absorbing solution downwardly flowing through the tower 6 becomes 6.3 to 7.0, and that of the absorbing solution downwardly flowing through the tower 1 becomes 5.8 to 6.5. Further, the interior temperature of the tower 6 is kept to be about 40°C and that of the tower 1 is about 45°C. Note that the self-circulation systems in the respective scrubbing towers and the jointly circulation system between both towers as illustrated in the drawing of U.S. Pat. No. 3,822,339 are omitted from the present FIG. 1 for simplification.

Figure 2:
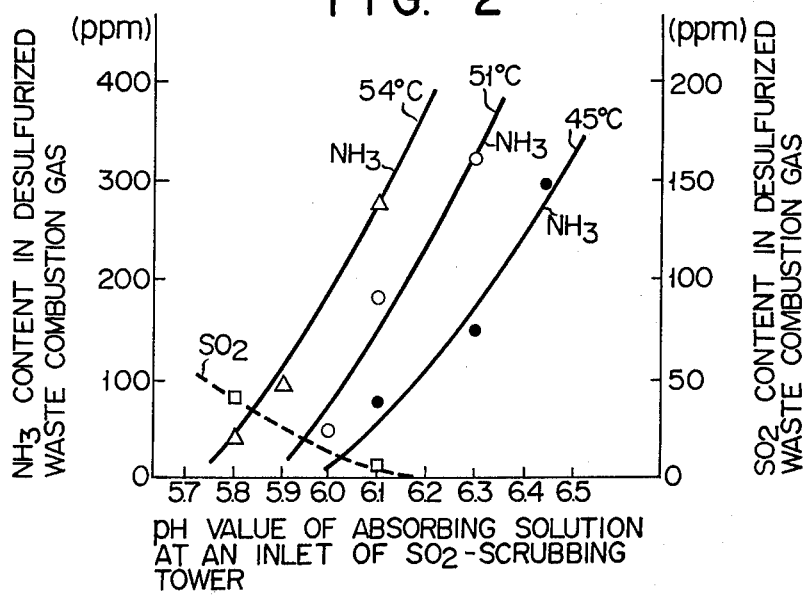
FIG. 2 is a curve diagram showing the relation between the pH value of absorbing solution at the inlet of desulfurization tower and the concentrations of $NH_3$ and $SO_2$ in the desulfurized gas at different temperatures.

As a result of continued investigation, the present inventors have found that the desulfurized exhaust 5 contains very small amounts of ammonia gas in various concentrations depending upon the pH value and the temperature of the $SO_2$-scrubbing solution. FIG. 2 is a curve diagram as obtained from the present inventors' experiments, illustrating the relation between the contents of $NH_3$ and $SO_2$ (as expressed in terms of ppm) in the desulfurized exhaust and the pH value of the $SO_2$-absorbing solution at an inlet place thereof. As seen from FIG. 2, where the pH value and the temperature of $SO_2$-absorbing solution are in the ranges of 6.1 to 6.5 and 50° to 55°C respectively, the content of $SO_2$ in the desulfurized exhaust is nearly 0 to 0, while the content of $NH_3$ in said exhaust ranges from about 150 ppm to 500 ppm.

The principle of this invention resides in utilizing the above-mentioned $NH_3$ contained naturally in the desulfurized exhaust as a reducing matter for $NO_x$ component of said exhaust, using an already known reducing dry catalyst at a temperature of about 300°C. The chemical reaction may be carried out according to the following equations.

$$6NO + 4NH_3 = 5N_2 + 6H_2O$$

$$N_2O_3 + 2NH_3 = 2N_2 + 3H_2O$$

$$6NO_2 + 8NH_3 = 7N_2 + 12H_2O$$

As the reducing dry catalyst, oxides of copper, chromium, cobalt, vanadium and pure iron are already known. Besides these oxides, the present inventors have discovered a novel catalyst which is the most effective and economical. This novel and cheap catalyst essentially consists of a byproduct iron oxide obtained in an iron works, such as coarse powders of iron ore, iron oxide powder scaled from steel surfaces, or coarse powders collected in a dust separator equipped to a blast furnace or iron ore sintering plant. Among them, coarse powder of iron ore is the best catalyst.

The process of reducing $NO_x$ will be explained in accordance with the flow diagram of FIG. 1. The desulfurized exhaust 5 coming out from the $SO_2$-scrubbing tower 1 is heated by a heater 12 up to about 200° to 450°C after being preheated by passing through a heat exchanger 11. The heater 12 is supplied with a small amount of fuel oil 13 and air 14, and the combustion gas is mixed with the desulfurized exhaust. The heated gas is introduced into a reducing catalyst chamber 15. After the aforementioned reducing reaction is carried out in the catalyst chamber 15, the resulting gas is discharged from the chamber, and then passed through the heat exchanger 11, and the waste gas 16 is released into the atmosphere. Note here that the space velocity through the catalyst is preferably about 5000 to 10,000 per hour. In this way, it is possible to reduce the content of $NO_x$ in the waste gas 16 to less than 20 ppm.

As described above, injurious gases of $SO_2$ and $NO_x$ contained in the exhaust of boiler furnace or iron ore sintering plant in an iron works can be removed very easily and economically by additionally equipping the desulfurization plant which utilizes coke oven gas with a simple reducing apparatus.

The following example will illustrate the practice of this invention.

An experiment was made to remove $SO_2$ and $NO_x$ from the exhaust of an iron ore sintering plant using an $SO_2$-scrubbing tower, whose size of effective part was 500 mm in diameter and 3000 mm in height, an $NH_3$-scrubbing tower, whose size of effective part was 400 mm in diameter and 3500 mm in height, and a reducing catalyst chamber, whose effective catalyst capacity was 75 liters. The exhaust gas and the coke oven gas had the following compositions.

| Composition of exhaust gas (by volume): | | |
|---|---|---|
| $CO_2$ | percent | 7.0 |
| $O_2$ | do. | 11.0 |
| CO | do. | 0.5 |
| $SO_2$ | ppm | 450 |
| $NO_x$ | do. | 185 |
| $N_2$ | | remainder |
| Composition of coke oven gas (by volume): | | |
| $CO_2$ | percent | 2.0 |
| $C_nH_m$ | do. | 4.0 |
| $CH_4$ | do. | 29.0 |
| CO | do. | 6.0 |
| $O_2$ | | trace |
| $H_2$ | percent | 56.0 |
| $N_2$ | | remainder |
| $NH_3$ | g/Nm³ | 8.4 |

The exhaust gas cooled to about 55°C was introduced into the $SO_2$-scrubbing tower at a rate of 450 Nm³ per hour, and an absorbing solution, having a temperature of 51°C and a pH value of 6.3, was circulated through said tower at a rate of 35 liters per minute. The $SO_2$ content in the outlet gas from the tower was 5 ppm, showing that the $SO_2$ gas was absorbed to an extent of 99%. Further the $NH_3$ content in the outlet gas from the same tower was 320 ppm. (See the curve diagram of FIG. 2.)

On the other hand, the coke oven gas cooled to about 40°C was introduced into the $NH_3$-scrubbing tower at a rate of 65 Nm³ per hour, and an absorbing solution having a temperature of 50°C and pH value of 6.45 was circulated through said tower at a rate of 30 liters per minute. The content of $NH_3$ in the outlet gas from the tower was 0.88 g/Nm³ indicating that $NH_3$ was absorbed to an extent of 87.3%.

The concentration of ammonium salts in each of scrubbing solutions was 32 percent by weight.

The outlet gas from the $SO_2$-scrubbing tower containing about 185 ppm of $NO_x$ was heated to about 400°C, and passed through the reducing catalyst chamber containing 75 liters of reducing catalyst which consists of steel scale powder. The space velocity in the chamber was 6000 per hour. The $NO_x$ content in the last waste gas was about 20 ppm, the reduction degree being about 89%.

What we claim is:

1. In combination with the method for removing $SO_2$ from waste combustion gas which contains $SO_2$ and $NO_x$ comprising washing said waste gas with an aqueous ammonium sulfite solution to remove $SO_2$ from said waste combustion gas by reaction with the said aqueous solution of ammonium sulfite to form an aqueous solution of ammonium hydrogen sulfite, and to also form a desulphurized waste combustion gas, and separating said desulphurized waste combustion gas from said aqueous ammonium hydrogen sulfite solution;

washing coke oven gas which contains $NH_3$ with said aqueous ammonium hydrogen sulfite solution to remove $NH_3$ from said coke oven gas as ammonium sulfite in aqueous solution, and separating said aqueous ammonium sulfite solution from said washed coke oven gas, continuously circulating both said solutions betwee both washing systems;

the step subsequently of reducing the $NO_x$ contained in said desulphurized waste combustion gas which has been separated from said aqueous ammonium hydrogen sulfite solution to $N_2$ comprising controlling the pH value and temperature of said circulating aqueous solution of ammonium sulfite to a pH of between 6.1 and 6.5 and a temperature of between 50° and 55°C so that the $NH_3$ content in said desulphurized waste combustion gas derived from the circulating solution is in the amount of from 150 to 500 ppm;

heating said desulphurized waste combustion gas containing said 150 to 500 ppm of $NH_3$ to a temperature of between 200° and 450°C; and contacting said heated desulphurized waste combustion gas with a reducing catalyst whereby said $NO_x$ in said desulphurized waste combustion gas is reduced by said $NH_3$ in said waste gas to $N_2$.

2. The method according to claim 1, wherein the waste combustion gas is an exhaust from a boiler furnace.

3. The method according to claim 1, wherein the waste combustion gas is an exhaust from a iron ore sintering plant.

4. The method according to claim 1, wherein the reducing catalyst is an oxide selected from the group consisting of copper oxide, chromium oxide, cobalt oxide, vanadium oxide and iron oxide.

5. The method according to claim 1, wherein the reducing catalyst is an iron oxide containing substance selected from the group consisting of iron ore, scale separated from steel surface, and dust collected in an iron works.

* * * * *